United States Patent [19]
Arnold

[11] 3,940,611
[45] Feb. 24, 1976

[54] METHOD FOR DETERMINING THERMAL NEUTRON DECAY TIMES OF EARTH FORMATIONS

[75] Inventor: Dan M. Arnold, Houston, Tex.
[73] Assignee: Texaco Inc., New York, N.Y.
[22] Filed: July 17, 1974
[21] Appl. No.: 489,329

[52] U.S. Cl. ............... 250/269; 250/262; 250/391
[51] Int. Cl.² ........................................... G01V 5/00
[58] Field of Search ........... 250/253, 262, 269, 270, 250/390, 391

[56] References Cited
UNITED STATES PATENTS

| | | | |
|---|---|---|---|
| 3,133,195 | 5/1964 | Jones et al. ..................... | 250/262 |
| 3,171,961 | 3/1965 | Yule ................................. | 250/269 |
| 3,638,484 | 2/1972 | Tixier .............................. | 250/262 X |

Primary Examiner—Archie R. Borchelt
Attorney, Agent, or Firm—T. H. Whaley; C. G. Ries; William J. Beard

[57] ABSTRACT

A method is disclosed for measuring the thermal neutron decay time of earth formations in the vicinity of a well borehole. A harmonically intensity modulated source of fast neutrons is used to irradiate the earth formations with fast neutrons at three different intensity modulation frequencies. The tangents of the relative phase angles of the fast neutrons and the resulting thermal neutrons at each of the three frequencies of modulation are measured. First and second approximations to the earth formation thermal neutron decay time are derived from the three tangent measurements. These approximations are then combined to derive a value for the true earth formation thermal neutron decay time.

8 Claims, 11 Drawing Figures fig. 6 fig. 1 fig.2 fig. 4a fig. 4 fig.5a fig.5

METHOD FOR DETERMINING THERMAL NEUTRON DECAY TIMES OF EARTH FORMATIONS

BACKGROUND OF THE INVENTION

This invention relates to in situ measurements of earth formations traversed by a well borehole. In particular the invention relates to the measurement of the thermal neutron lifetime or thermal neutron decay time of earth formations in the vicinity of a well bore.

The techniques used in the present invention include the generation as a function of time of a phase coherent intensity modulated cloud of fast neutrons in a well bore which results in the creation of a phase coherent thermal neutron cloud being produced as the fast neutrons are slowed to thermal energy by the materials in the vicinity of the well bore. Measurements of the relative phase of the thermal neutron cloud population density with respect to the fast neutron cloud generated lead to the determination of parameters relating to the thermal neutron decay time or neutron lifetime of the formations in the vicinity of the well bore and the borehole fluid itself.

BRIEF DESCRIPTION OF THE PRIOR ART

At the present time there are two principle techniques used for measuring, in situ, the thermal neutron decay time or thermal neutron lifetime of earth formation in the vicinity of well borehole. These neutron lifetime measurements have proven to be particularly valuable in evaluating earth formations in cased well boreholes. In both of these techniques a logging instrument which traverses the well bore uses a pulsed source of high energy or fast (14 MEV) neutrons.

In the first of these measurement techniques the neutron source is repetitively pulsed. For each fast neutron pulse, a cloud of fast neutrons is injected in a generally spherically symmetric fashion about the source to the surrounding earth formations. The fast neutron cloud passes from the well tool through the drilling mud, well bore casing, and cement between the casing and earth formations surrounding the well bore. Each such pulse of fast neutrons has approximately a constant intensity and lasts typically for a time duration of from 20 to 30 microseconds. This time lapse is generally adequate to create a thermalized (or low energy) neutron population in the earth formations and borehole. The number of thermal neutrons comprising this cloud or population then decays exponentially due to the capture of the thermalized neutrons by formation and borehole elemental nuclei.

After an initial time period, (about 300 microseconds) during which resultant gamma ray effects in the borehole, mud, and casing are substantially dissipated, measurements of the number of thermalized neutrons in the vicinity of the well tool are made during two successive time intervals and can be used to define an exponential decay curve for the thermal neutron population either in the borehole or the earth formation surrounding the borehole. Which of these two thermal neutron decay characteristics is being measured is not known with certainty due to the fact that the assumption is made in this measurement technique that the borehole thermal neutron decay time is substantially shorter and hence dies out quicker than that of the surrounding earth formations. This assumption that the borehole component of thermal neutron decay time (or thermal neutron lifetime) is generally shorter than the formation thermal neutron decay time or thermal neutron lifetime usually occurs where drilling fluids having a high chlorine content (or salt water content) are encountered. However, in boreholes containing air, gas, fresh water or oil this relationship does not always hold. One striking advantage of the present invention over this prior art thermal neutron lifetime measuring technique is that no assumption is made as to the relative thermal neutron decay characteristic of the borehole fluid or with respect to that of the formations surrounding the borehole. Accordingly, the present invention overcomes the aforementioned limitation of the prior art.

Measurements of the number of thermalized neutrons in the vicinity of the well tool during the successive time intervals following the initial time lapse to allow for die away of borehole effects can be used to define an exponential decay curve for the thermal neutron population of the earth formations in the vicinity of the borehole.

These two time intervals or time gates, for example, can be fixed between 400–600 microseconds following the neutron burst, and between 700–900 microseconds following the neutron burst in typical earth formations, and under borehole conditions wherein a saline fluid or high chlorine content salt is present in the borehole fluid.

If neutron diffusion effects are ignored, the relationship for the decay of a thermal neutron population in a homogeneous medium having a thermal neutron macroscopic capture cross-section can be expressed as:

$$N_2 = N_1 e^{-\epsilon vt} \quad (1)$$

wherein $N_1$ is the number of thermal neutrons at a first point in time, $t_1$; $N_2$ is the number of thermal neutron at a later point in time, $t_2$; $e$ is the Naperian logarithm base; $t$ is the time between two measurements $(t_2-t_1)$; and $v$ is the velocity of the thermal neutrons. The macroscopic thermal neutron capture cross section $\epsilon$ of a reservoir rock (which can be obtained from Equation (1) is dependent upon its porosity, the formation water salinity, and the quantity and type of petroleum contained in the pore spaces therein and thus is a valuable measurement to obtain.

When neutrons from the high energy neutron source interact with the materials in a well bore and with surrounding earth formations, they are slowed down and lose energy. A primary agent for slowing down neutrons is hydrogen which is relatively available in water and hydrocarbon. After the fast neutrons have been slowed they are captured by formation nuclei (primarily by chlorine) and, in general, will generate characteristic capture gamma rays before returning to a stable state. It is the capture gamma rays which are detected during the two different time intervals of this system of measuring thermal neutron decay time. The number of such gamma rays detected is proportional to the thermal neutron population in the vicinity of the well tool. Alternatively, thermal neutrons themselves can be detected during these intervals by the use of helium 3 or boron trifluoride detectors if desired. Thus, by means of the two fixed time gating measurements the thermal neutron macroscopic capture cross section $\epsilon$, can be determined.

A second prior art technique for measuring thermal neutron decay time or thermal neutron lifetime uses the reciprocal of the macroscopic thermal neutron capture cross section $\epsilon$ which is defined in terms of $\tau$ (the time constant for absorption of the thermal neutrons). A relationship analogous to Equation (1), but defined in terms of $\tau$ is given by:

$$N = N_o e^{-t/\tau} \quad (2)$$

where $\tau = 1/v\epsilon$

Here $N$ is thermal neutron density at any time $t$; $N_o$ is the thermal neutron density at an initial time $t_o$; $e$ is the Naperian constant; $\tau$ is the time required for the thermal neutron population to decay to $1/e$ of its value at $t_o$.

In measuring the thermal neutron decay time using this second prior art technique, the logging equipment obtains counts of capture gamma rays during two successive time intervals following the generation of the thermal neutron cloud in the vicinity of the well borehole to define the exponential decay curve. In this technique, however, the two time intervals of the measurement are defined as a function of the $\tau$ actually measured during a previous measurement cycle. The value of $\tau$ previously measured is used to establish the neutron burst duration for the generation of the fast neutrons; the waiting interval to the opening to the first time gate, the duration of the first time gate, the duration of the time between the time gates and the duration of the second time gate. All of these times are related to $\tau$, as previously measured. This technique is commonly referred to in the art as the "sliding gate" technique.

Both of the foregoing systems of measurement have been successfully used to measure the decay time or lifetime of thermal neutrons as long as the borehole component of thermal neutron population dies away substantially faster than the formation component of the thermal neutron population in the vicinity of the borehole. Both of these techniques utilize a neutron burst of substantially constant intensity (a square wave neutron pulse).

BRIEF DESCRIPTION OF THE INVENTION

In the present invention a well logging tool is moved through the borehole and includes an intensity modulated fast neutron source and a gamma ray detector (or, alternatively, a thermal neutron detector). A single such detector is used. The neutron source generates a generally harmonically varying population of fast neutrons as a function of time. These neutrons are introduced into the media surrounding the well borehole and result in a thermal neutron population being generated from the slowing down of the fast neutrons in the media and borehole itself. This cloud of thermalized neutrons itself comprises a phase coherent intensity varying neutron population whose presence is detected as a function of time by the thermal neutron or gamma ray detector. The fast neutron source is harmonically or sinusoidally modulated at a plurality of frequencies. The relative phase angle of the phase coherent thermal neutron population which is generated at each of the modulation frequencies is detected by the detector. This phase angle information contains components due to the effect of the borehole fluid and the media surrounding the borehole. By appropriately combining these measurements made at the plurality of different modulation frequencies according to predetermined relationships, the thermal neutron lifetime (or thermal neutron decay time) of the borehole fluid and the media surrounding the well bore may be determined.

In practice, the measurements of the relative phase angles at each of the modulation frequencies are made by combining counts from the detector in a particular manner to derive the value of the tangent of the phase angle. From this tangent information the formation thermal neutron decay time $\tau$ or the corresponding thermal neutron macroscopic capture cross section value $\epsilon$ can be established.

Novel electronic systems are provided in the downhole tool and at the surface for producing a sequence of different frequency intensity modulated fast neutron clouds operating at least at three different frequencies of operation. Synchronization (or sync) pulses are also generated and these provide a means for separating the counts of gamma rays representative of thermal neutrons during the portion of a measurement cycle corresponding to measurements made at each of the different frequencies of intensity modulation of the neutron source. At the earth's surface the signals from the downhole tool are separated and counts are made as a function of time of the thermal neutron population in the vicinity of the tool at each of the three frequencies. These counts are used to determine the tangents of the relative phase angles between the thermal neutron populations and the source of fast neutrons at each of the frequencies. A recorder is provided for making a record of these measurements as a function of the borehole depth of the well tool. Moreover, the invention includes techniques for determining the value of the thermal neutron decay time $\tau$ and/or the macroscopic thermal neutron capture cross section $\epsilon$ of both the media surrounding the borehole and the borehole fluid.

The invention is best understood by reference to the following detailed description thereof, when taken in conjunction with the corresponding drawings in which:

DESCRIPTION OF THE PREFERRED EMBODIMENT

The present invention contemplates making measurements of the intensity phase shift of a phase coherent thermal neutron population cloud with respect to the intensity modulated fast neutron population generated by a neutron source at three different intensity modulation frequencies. By appropriately combining the measurements of the phase shift at each of the frequencies the thermal neutron lifetime (or decay time) of both the borehole component of the neutron flux and the formation component of the neutron flux may be determined.

Figures 1, 6:
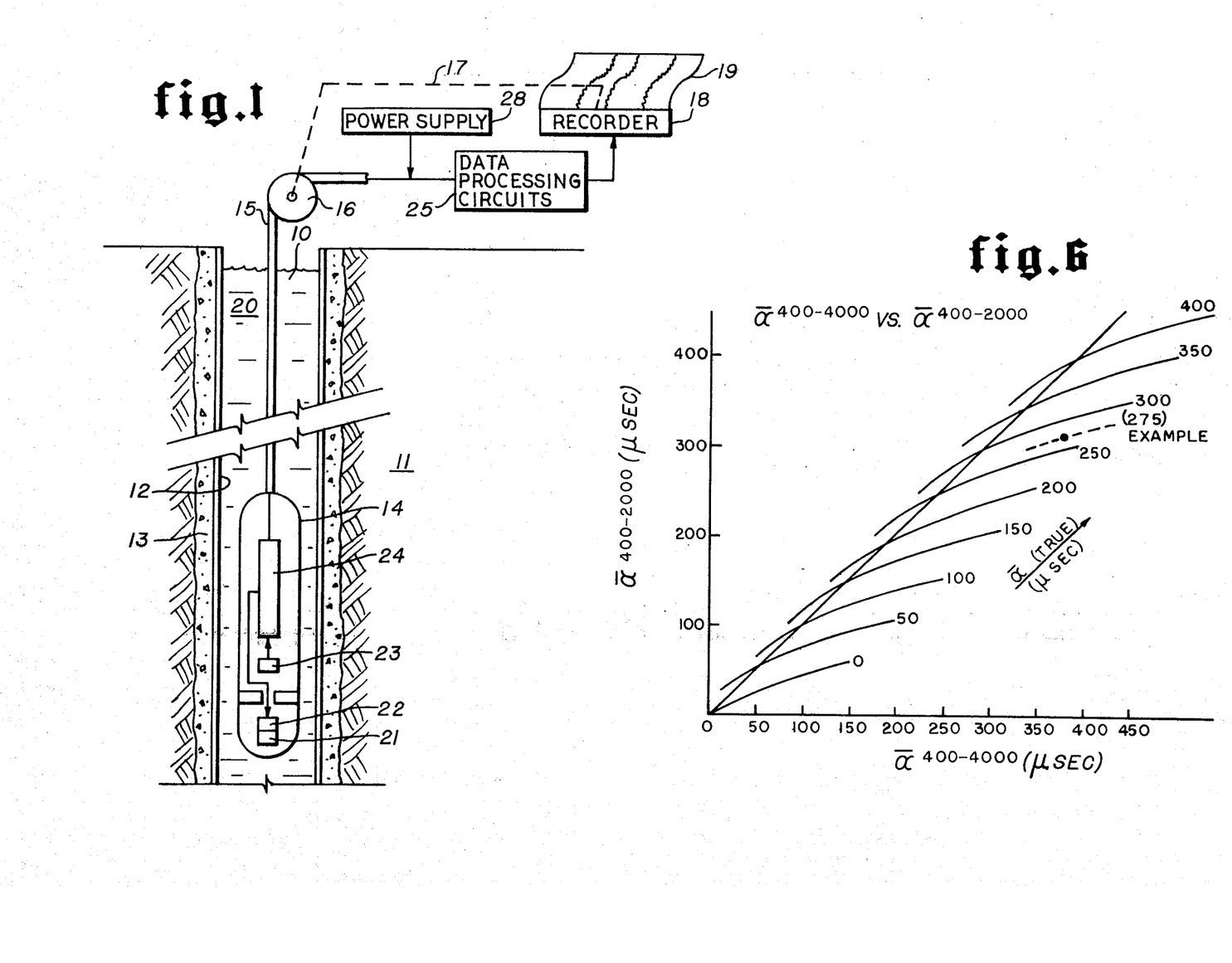
FIG. 1 is an overall block diagram illustrating schematically the apparatus of the invention in a well borehole.
FIG. 6 is a graphical representation showing the relationship between thermal neutron lifetime measured by phase angles measured at two different pairs of frequencies of modulation.

Referring initially to FIG. 1, a system in accordance with the concepts of the invention is illustrated schematically. A well borehole 10 traverses earth formations 11, and is lined with a tubular casing 12, which is cemented in place by cement layer 13. Suspended in the borehole 10 is a well logging sonde 14 which is suspended therein by an armored well logging cable 15. The cable 15 passes over a sheave wheel 16 which is electrically or mechanically linked (as indicated by the dotted line 17) to a recorder 18 of the type conventionally used in well logging. The record medium 19 of the recorder 18 may thus be driven as a function of the borehole depth of the well logging tool. The borehole 10 is filled with a fluid 20 which may be either a salt (saline) solution or fresh water or oil. The present invention works equally well in salt or fresh water environments which is an advantage over prior art thermal neutron lifetime or decay time measuring systems which did not perform well in fresh water or oil filled boreholes.

The well logging sonde 14 used with the present invention contains a neutron generator 21, circuitry for driving the neutron generator 22, and a gamma ray detector 23. Appropriate circuitry 24 for controlling the neutron generator 21 and for amplifying signals from the detector 23 is also provided. A surface power supply 28 provides operative power for the downhole systems via the conductors of the well logging cable 15. Signals from the downhole tool are processed by surface data processing circuits 25 which will be described in more detail subsequently. Output signals from the data processing circuits 25 are supplied to the recorder 18 whose record medium 19 is driven as a function of depth as previously mentioned.

The gamma ray detector 23 may be a thallium doped sodium or cesium iodide crystal which is optically coupled to a photomultiplier tube. A control electronic section 24 provides signals, as will be subsequently described in more detail, to operate the neutron generator 21 and the photomultiplier and detector 23. Radiation detected by the detector 23 is presented for transmission to the surface as sharply peaked positive voltage pulses which will be described in more detail subsequently. These pulses are presented to the cable 15 conductors for transmission to the surface. Similarly, large amplitude sharp peaked synchronization (negative voltage) pulses are also supplied, as will be described in more detail subsequently, for transmission to the surface, on cable 15 conductors.

The neutron generator 21 is preferably of the deuterium-tritium accelerator type as known in the art. This type of neutron source accelerates deuterium ions onto a target material which is impregnated with tritium. The deuterium ions are supplied from a replenisher which comprises a material impregnated with deuterium which is boiled off by heating. The deuterium atoms thus provided are then supplied to an ion source comprising a region of the tube in which electric fields are provided to ionize the atomic deuterium from the replenisher and to focus the positive ions into a beam suitable for acceleration onto the target material. The target material is generally kept at a high negative potential. The ion source is provided with an electrode structure analogous to that of a conventional triode vacuum tube and having an element analogous to the control grid of such a tube. By applying a time varying voltage to this control grid element the resultant intensity of neutron output of the accelerator tube may be modulated as a function of time. In this manner a harmonically or sinusoidally alternating intensity neutron output may be produced. For a more detailed description of the methods employed to produce an intensity modulated fast neutron flux as a function of time, reference may be had to the paper entitled "The Generation of Neutron Pulses and Modulated Neutrons Fluxes with Sealed Off Neutron Tubes" by C. W. Elenga and O. Reifenscheweiler, published in the Proceedings of the Symposium on Pulsed Neutron Research, Vol. II, pages 609–622, 10th–14th of May, 1965, published by the International Atomic Energy Agency of Vienna, Austria. This paper describes in detail techniques which may be utilized to provide a smoothly modulated neutron flux from a tube of the deuterium-tritium accelerator type as a function of time. Other wave shapes than purely harmonic or sinusoidal modulation may be produced also using these techniques.

For a clearer understanding of the present invention it will be helpful to consider first an explanation of its underlying principles. In this explanation certain simplifying assumptions are made for ease of analysis. For example, it is assumed that a spatially distributed source of thermal neutrons (or a thermal neutron cloud) is created in the earth formations by the action of the high energy neutron source. Also, it is assumed that the slowing down time $T_{AS}$ for the fast neutrons produced by the deuterium-tritium source is considerably shorter than the thermal neutron decay time $T_a$. This assumption is valid, for example, in high porosity fluid saturated sands such as those of interest in oil well logging.

In general in thermal neutron lifetime well logging it is assumed (and also generally experienced) that the thermal neutron population as measured by a detector in the well bore decays with time after a neutron burst or pulse according to the following mathematical expression:

$$n(t) = A e^{-\alpha t} + B e^{-\beta t} \qquad (3)$$

In Equation (3), N(t) ) is the neutron population as measured by the detector, $A e^{-\alpha t}$ is the neutron population of the formation component as measured by the detector, and $B e^{-\beta t}$ is the neutron population of the borehole environment component as measured by the detector. The constants A and B are the initial thermal neutron densities at time $t = O$ in the earth formation (A) and the borehole (B) respectively. The constants $\alpha$ and $\beta$ are the thermal neutron decay constants of the earth formation ($\alpha$) and the borehole ($\beta$), respectively.

In making measurements of the thermal neutron population as a function of time it will be recognized by those skilled in the art that the detector 23 of FIG. 1 could be either a thermal neutron detector (such as a helium 3 or boron trifluoride detector) or could be gamma ray detector such as a sodium or cesium iodide thallium activated crystal. If a thermal neutron detector, such as the helium 3 or boron trifluoride detectors are used, then the thermal neutrons are measured directly. If a sodium iodide thallium activated crystal detector is used, then gamma rays resulting from the capture of thermal neutrons are detected. This provides an indirect, but proportional, measurement of the number of thermal neutrons present. In either event the thermal neutron population may be determined as a function of time by counting the number of electrical pulses produced by the detector.

Equation (3) may be Fourier transformed from the time domain into the frequency domain and may be rewritten in the frequency domain as:

$$N(\omega) = \frac{1}{\sqrt{2\pi}} \left[ \left( \frac{A\alpha}{\alpha^2+\omega^2} + \frac{B\beta}{\beta^2+\omega^2} \right) - i \left( \frac{A\omega}{\alpha^2+\omega^2} + \frac{B\omega}{\beta^2+\omega^2} \right) \right] \quad (4)$$

In Equation (4), $N(\omega)$ is the neutron population in the frequency ($\omega$) domain. The other symbols A, B, $\alpha$ and $\beta$ are as previously defined.

Irradiating the earth formation and the borehole environment with a phase coherent souce of fast neutrons which is modulated harmonically at an angular frequency ($\omega$), the resulting cloud of thermal neutrons (and/or capture gamma rays as measured by a thermal neutron or gamma ray detector) is also phase coherent and harmonically modulated, but with a phase lag $\phi$ relative to the neutron source. The phase lag $\phi$ is a function of the excitation frequency $\omega$, the decay constants $\alpha$ and $\beta$ of the earth formation and the borehole environment, respectively. It may be shown that the tangent of the phase angle is given by the following expression:

$$-\operatorname{Tan}\phi = \omega \frac{A + B\left(\frac{\alpha^2+\omega^2}{\beta^2+\omega^2}\right)}{A\alpha + B\beta\left(\frac{\alpha^2+\omega^2}{\beta^2+\omega^2}\right)} \quad (5)$$

where the symbols A, B, $\alpha$, $\beta$, $\omega$ and $\phi$ are as previously defined.

Equation (5) may be simplified by making the substitutions $B/A = R$, and $\operatorname{Tan}\phi/\omega = X$ resulting in:

$$R\left(\frac{\alpha^2+\omega^2}{\beta^2+\omega^2}\right) = \frac{1+\alpha x}{1+\beta x} \quad (6)$$

Equation (6) contains the three unknown parameters required to determine the earth formation thermal neutron decay constant $\alpha$ (the reciprocal of the thermal neutron decay time), the borehole thermal decay constant $\beta$, and the ratio of amplitudes of formation and borehole thermal neutron components R. The variable $\alpha$ is the most desirable one of these parameters to obtain knowledge of. It is an indication (i.e., the reciprocal) of the formation thermal neutron decay time which, as has been previously discussed, is very important in determining the possible hydrocarbon content and water saturation of earth formations in the vicinity of a well bore. Since Equation (6) contains three unknowns R, $\alpha$, and $\beta$, at least three independent equations are needed to determine these three unknowns. The three independent equations for determining the three unknowns R, $\alpha$, and $\beta$ may be obtained by independently measuring the phase shift at three different modulation frequencies $\omega_1$, $\omega_2$ and $\omega_3$. Assuming that relative phase angle measurements are made at three different modulation frequencies $\omega_1$, $\omega_2$ and $\omega_3$, three equations of the form of Equation (6) are obtained. Combining two of these equations, the unknown variable R may be eliminated resulting in:

$$\left(\frac{1+\alpha x_1}{1+\alpha x_2}\right)\left(\frac{\alpha^2+\omega_2^2}{\alpha^2+\omega_1^2}\right) = \left(\frac{1+\beta x_1}{1+\beta x_2}\right)\left(\frac{\beta^2+\omega_2^2}{\beta^2+\omega_1^2}\right) \quad (7)$$

where $X_1 = \operatorname{Tan}\phi_1/\omega_1$ and $X_2 = \operatorname{Tan}\phi_2/\omega_2$.

Equation (7) may be rewritten in the following form as a cubic equation in the unknown $\alpha$ (earth formation thermal neutron decay constant).

$$a_3\alpha^3 + a_2\alpha^2 + a_1\alpha + a_0 = 0 \quad (8)$$

In Equation (8) the coefficients $a_i$ are functions of $\beta$, $X_1$, $X_2$, $\omega_1$ and $\omega_2$ which are given by the following set of equations:

$a_3=\beta^2(x_2-x_1)+\beta(\omega_2^2-\omega_1^2)x_1x_2+(\omega_2^2x_2-\omega_1^2x_1)$
$a_2=\beta^2(x_1-x_2)+\beta(\omega_2^2x_1-\omega_1^2x_2)+(\omega_2^2-\omega_1^2)$
$a_1=\beta^3(\omega_1^2-\omega_2^2)x_1x_2+\beta^2(\omega_1^2x_2-\omega_2^2x_1)+(x_2-x_1)\omega_1^2\omega_2^2$
$a_0=\beta^3(\omega_1^2x_1-\omega_2^2x_2)+\beta^2(\omega_1^2-\omega_2^2)+\beta(x_1-x_2)\omega_1^2\omega_2^2$ Similarly measurements may be made at frequencies $\omega_1$ and $\omega_3$ and combined in Equation (7) yields:

$$b_3\alpha^3+b_2\alpha^2+b_1\alpha+b_0=0 \quad (10)$$

Here the $b_i$ are functions of $\beta$, $X_1$, $X_3$, $\omega_1$, and $\omega_3$ similar to the expressions given in Equations (9) but substituting $X_3$ for $X_2$, and $\omega_3$ for $\omega_2$ in Equations (9). Equation (10) may also be written in another form as Equation (11):

$$c_3\beta^3+c_2\beta^2+c_1\beta+c_0=0 \quad (11)$$

where the $c_i$ are functions of $\alpha$, $X_1$, $X_3$, $\omega_1$ and $\omega_3$.

Equations (8) and (11) represent two independent equations with $\beta$ and $\alpha$ as the unknowns. These equations may be solvent for $\alpha$ and $\beta$, the quantities of interest, by using graphical techniques to be described.

Figure 5:
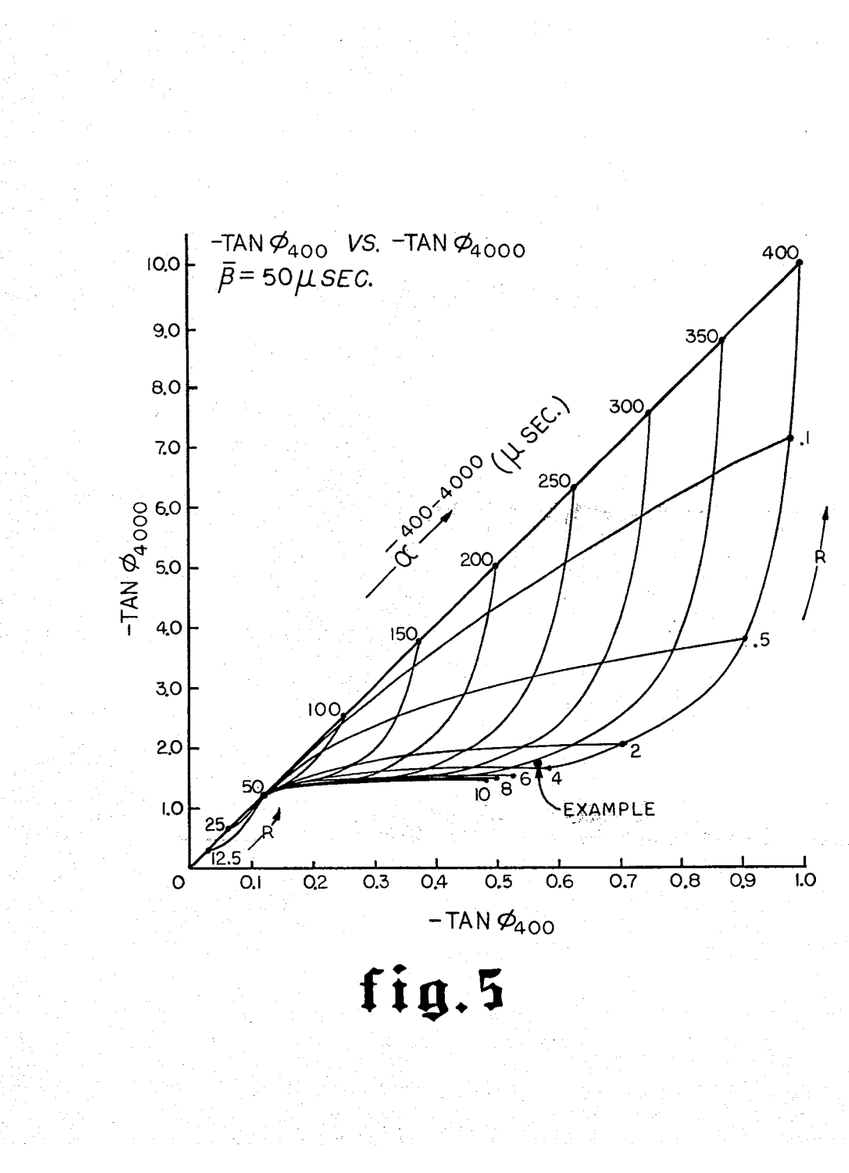
FIGS. 5 and 5a are graphical representations showing the realtionship between the phase angle tangents at two different modulation frequencies.
Figure 5A:
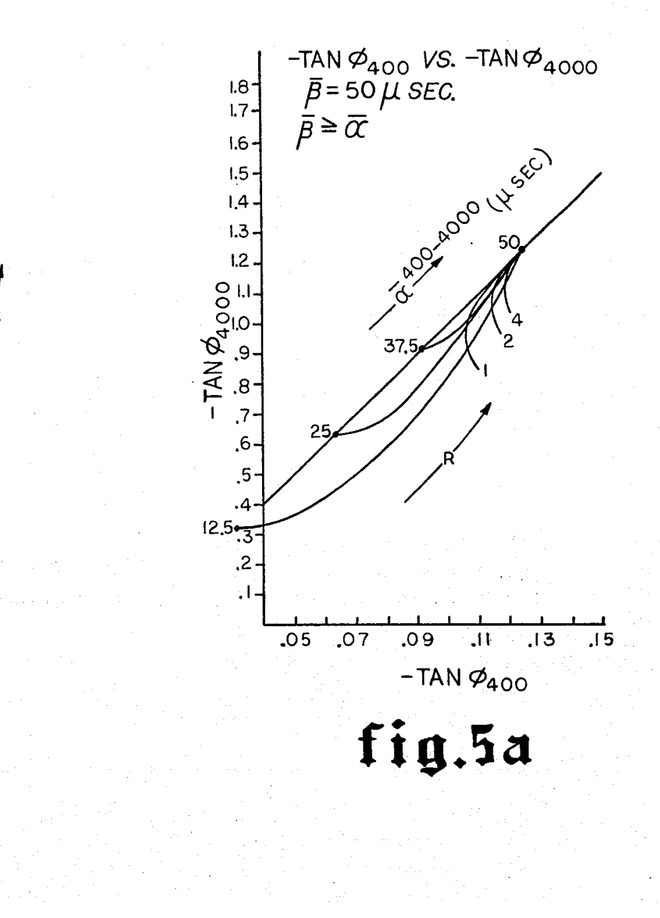

The three different frequencies of intensity modulation of the neutron source chosen for use in the present invention are 400 Hertz, 2000 Hertz, and 4000 Hertz. It will be appreciated by those skilled in the art that frequencies other than these may be used if desired without compromising the inventive concepts. However, these frequencies are suitable for the purposes of this description. Referring now to FIG. 5, a family of curves is shown which plots $-\operatorname{Tan}\phi_{4000}$ versus $-\operatorname{Tan}\phi_{4000}$ for various values of R and with $\bar{\beta} = 50$ microseconds (here $\bar{\beta}= 1/\beta$). These values were calculated from Equation (5) using neutron source modulation frequencies ($f = \omega/2\pi$) 400 and 4000 Hertz, respectively. FIG. 5a is an expansion of the region of FIG. 5 near the origin in which $\bar{\beta}$ is greater than or equal to $\bar{\alpha}$ (here $\bar{\alpha} + 1/\alpha$ $1/\alpha$).

Figure 4:
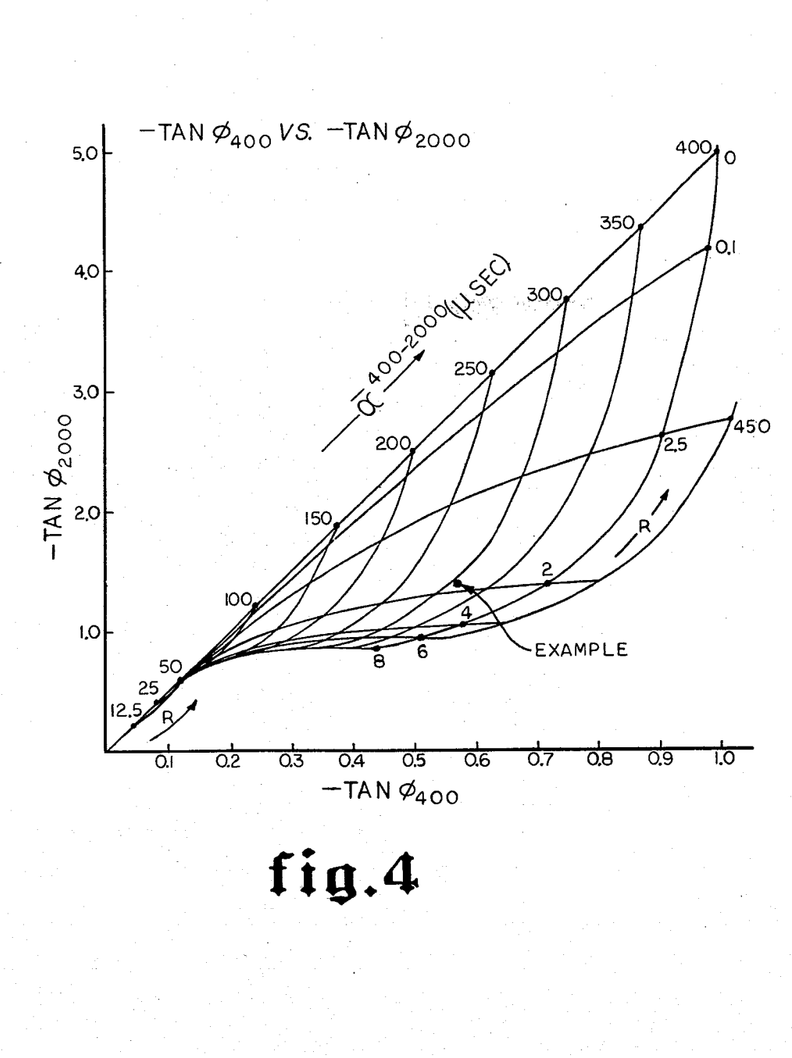
FIGS. 4 and 4a are graphical representations showing the relationship between the phase angle tangents at two different modulation frequencies.
Figure 4A:
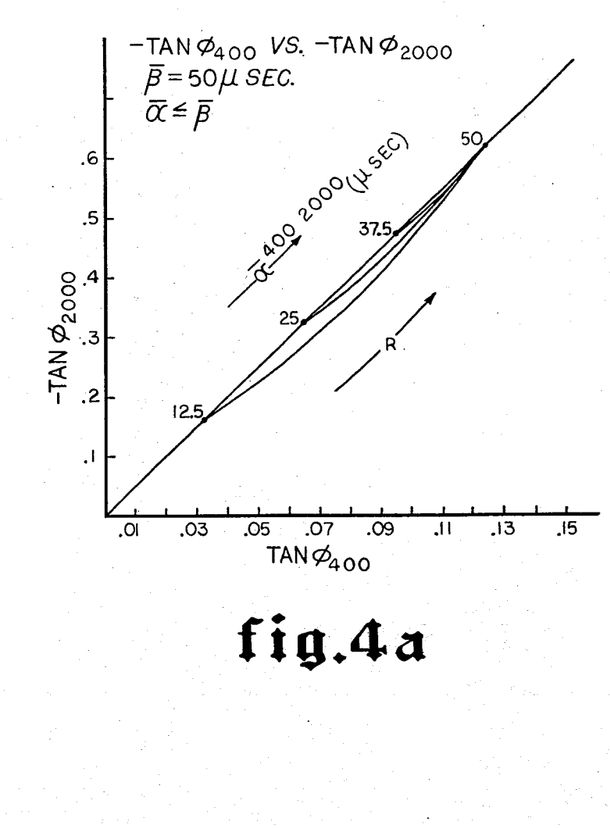

FIG. 4 similarly is a second family of curves wherein $-\operatorname{Tan}\phi_{400}$ is plotted against $-\operatorname{Tan}\phi_{2000}$ for various values of R and $\bar{\alpha}$ with $\bar{\beta} = 50$ microseconds. Again, these values were computed from Equation (5) at the respective frequencies. FIG. 5a is an expansion of the curves of FIG. 5 in the vicinity near the origin where $\bar{\beta}$ is greater than or equal to $\bar{\alpha}$.

If we assume for the present that the borehole has $\bar{\beta} = 50$ microseconds, then by measuring $-\operatorname{Tan}\phi$ at two frequencies the $\bar{\alpha}$ (true) (true decay time of the formation) may be determined by comparing the measurements of these values of $-\operatorname{Tan}\phi$ at the two frequencies and using either the graphical representation of FIGS. 4 or 6 for this purpose. Similarly, if the borehole component decay time $\bar{\beta}$ is known, then figures similar to either FIGS. 4 or 5 could be used to measure this $\bar{\alpha}$ (true) of the formation by using these graphical representations at whichever pair of frequencies is desired (i.e., 400–2000 or 400–4000).

However, in field operations $\bar{\beta}$ is in general not known and can even vary within a given well depending upon the condition of the borehole fluid, the borehole diameter, the cement thickness or casing size. In this more realistic situation it is necessary to utilize three frequency measurements. In this case both $\bar{\alpha}$ (true) and $\bar{\beta}$ (true) may be determined in the following manner. First, the charts of FIGS. 4 and 5 are utilized to determine an apparatus $\bar{\alpha}$, from each of the two pairs of different frequency phase angle determinations (i.e., the $\bar{\alpha}$ apparent from the 400–2000 Hertz combination, and the $\bar{\alpha}$ apparent with the 400–4000 Hertz modulation frequencies). Then the spine and ribs plot of FIG. 6 is utilized. In FIG. 6 the value of $\bar{\alpha}$ apparent at each of these frequency combinations is plotted. The $\bar{\alpha}$ (true) is then determined from the location of the point on the graphical representation of FIG. 6 which provides a unique solution for $\bar{\alpha}$ (true) regardless of the value of R and $\bar{\beta}$. Once the $\bar{\alpha}$ (true) value is determined in this fashion, $\bar{\beta}$ may be obtained by substituting the $\bar{\alpha}$ (true) value back into Equation (7) and solving this equation for $\bar{\beta}$.

The use of this graphical technique for determining $\bar{\alpha}$ and $\bar{\beta}$ can be more readily understood by an illustration of a hypothetical example. Assume that the following values of the phase shift at the three frequencies have been measured $-\text{Tan}_{400} = 1.565$, $-\text{Tan}_{4000} = 1.712$, and $-\text{Tan}_{4000} = 1.410$. These data points have been plotted in FIGS. 4, 5 and 6 as illustrated (labelled "EXAMPLE" therein). It may be seen that these values for the phase shift angles indicate $\bar{\alpha}$ (true) value of 275 microseconds. This value is substituted in Equation (7) yielding $\bar{\beta} = 50$ microseconds. The value of $\bar{\alpha}$ (true) may be checked by computing $-\text{Tan}_{4000}$ and $-\text{Tan}_{2000}$ using Equation (5) with $\bar{\beta} = 50$ microseconds, and setting R = 1.6. Comparing the calculated $-\text{Tan}\phi$ values therefrom with the corresponding hypothetical values which were given in the example shows that the above-described measurement procedure is self-consistent and yields a unique solution for the $\bar{\alpha}$ (true) of the formation.

While the above description of the solution of the foregoing equations for the true formation decay time, $\bar{\alpha}$ (true) have been expressed in terms of graphical solutions performed by use of the graphs of FIGS. 4, 5 and 6, it will be appreciated by those skilled in the art that these graphical representations could be utilized within a properly programmed digital computer located either at the well site in which the measurements are made, or in a remote location, if desired. A small general purpose digital computer such as the model PDP-11 made by the Digital Equipment Corporation of Cambridge, Massachusetts could be suitable for this purpose. The graphical representations corresponding to FIGS. 4, 5, and 6 may be entered in the memory of such a digital computer in the form of tables. Appropriate interpolation techniques may be utilized to reach the combination of graphical solutions just described with respect to FIGS. 4, 5 and 6. Thus, it is seen if a well logging tool which can measure the values of the tangent of the phase shift $\phi$ at each of three chosen frequencies of intensity modulation of the neutron source is provided, that these measurements of the phase angle tangent values may then be appropriately combined to derive the true formation and borehole thermal neutron decay time parameters of interest. It is, of course, well known in the art that once the true formation and borehole thermal neutron decay time parameters are known, then appropriate techniques which are known in the art may be applied to derive the formation water saturation (and hence the oil saturation of the formation, providing the porosity is known from another source).

Figure 2:
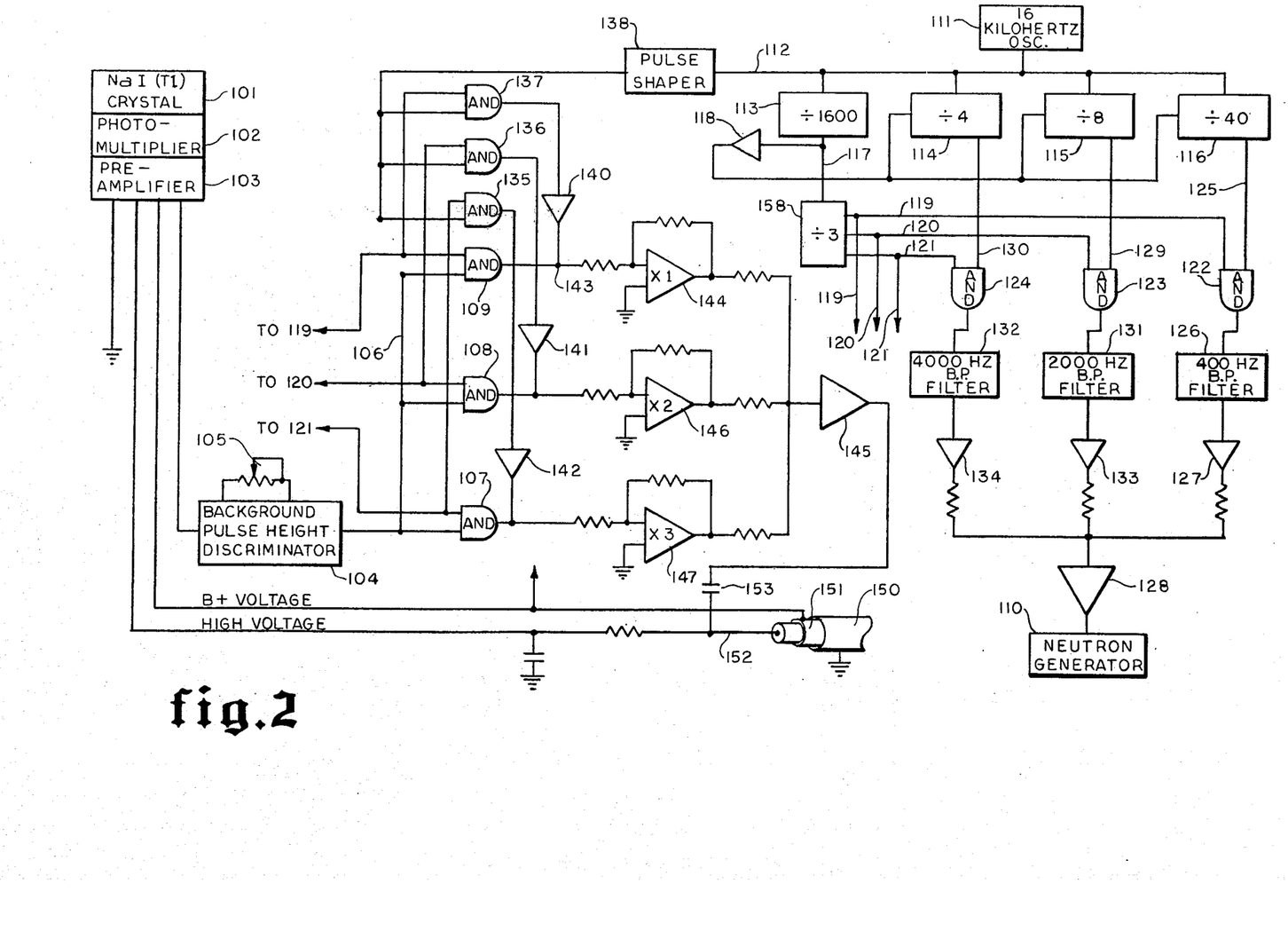
FIG. 2 is a circuit diagram showing the downhole portion of the system of the invention.
Figure 3:
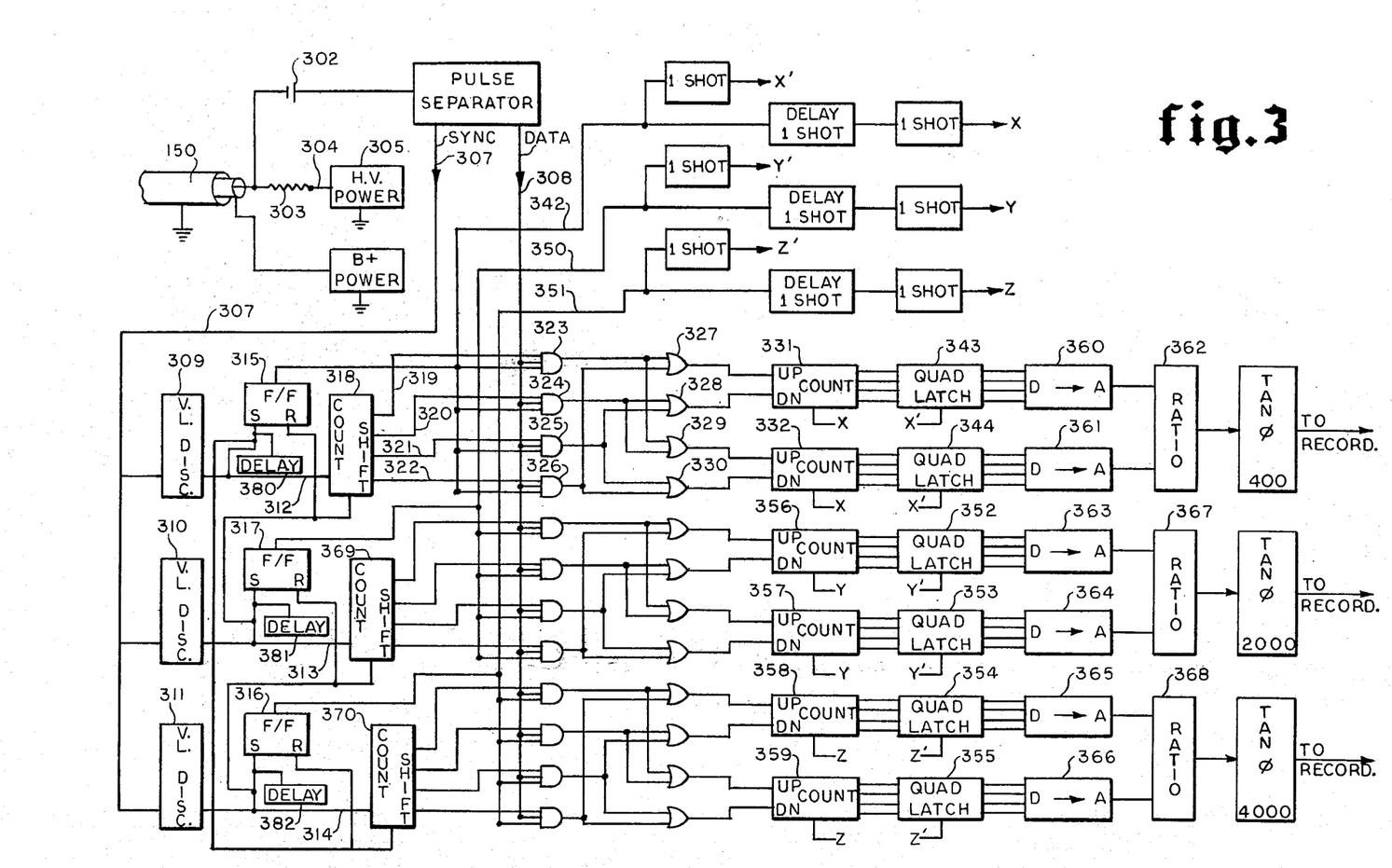
FIG. 3 is a circuit diagram showing the surface portion of the system of the invention.

Referring now to FIGS. 2 and 3 the well logging system shown systematically in FIG. 1 is illustrated in more detail. Considering first the circuitry of the downhole portion of the system in FIG. 2, it will be seen that a gamma ray detector comprising a thallium doped sodium iodide crystal 101 is optically coupled to a photomultiplier tube 102 which produces electrical pulses proportional in height to the energy of the gamma ray impinging upon the sodium iodide crystal 101. The electrical pulse signals from the photomultiplier tube 102 are amplified by a preamplifier 103 and supplied therefrom to a pulse height discriminator 104. Discriminator 104 is used to discriminate against relatively low energy background gamma radiation and has an adjustable discriminator level as indicated by potentiometer 105. This level is usually set at about 0.5 MEV, so that gamma rays resulting from naturally occurring background radiation may be discriminated against. The output data pulses from the pulse height discriminator 104 are supplied via line 106 to three AND gates 107, 108, and 109 whose conditioning will be described in more detail subsequently.

The transmission of the data pulses to the surface is controlled in synchronization with the operation of the neutron generator tube 110 of FIG. 2. A 16 kilohertz oscillator driver 111 is utilized to generate timing pulses. The 16 kilohertz output pulses from the oscillator 111 are supplied on a line 112 as inputs to a divide by 16,000 divider circuit 113, to a divide by 4 divider circuit 114, to a divide by 8 divider circuit 115, and to a divide by 40 divider circuit 116. As the frequency of the 16 kilohertz oscillator is divided by 16,000 in the divider circuit 113, output pulses are produced by the divider 113 which occur once each second during the operation of the system. The once per second output pulses are provided from divider 113 on line 117 and are used to trigger (via an amplifier 118) the reset of divider circuits 114, 115, and 116 once each second.

The once per second output pulses from the divider 113 are also supplied by to a divide by 3 one shot multivibrator 158 which has multiple outputs comprising lines 119, 120, and 121. Divide by 3 one shot circuit 158 functions, upon the receipt of a pulse on its input line 117, to produce a voltage level output on line 119 for a one second duration beginning upon receipt of the first such pulse on its input line 117. Upon receipt of its second input pulse on line 117 (at the end of one second of operation) the output voltage level is removed from line 119 and applied to line 120. Similarly at the end of the second one second of operation, the third input pulse is received on input lead 117, divide by 3 one shot 158 produces an output voltage level of one second duration on line 121. Upon receipt of the fourth one second input pulse on line 117 the output voltage level is removed from line 121 and restored to line 119. Thus, the divide by 3 one shot 158 provides successive conditioning voltage levels on output lines 119, 120, and 121 which are used to condition successively three AND gates 122, 123, and 124.

Considering now the generation of a 400 Hertz sine wave modulation which is to be applied to the neutron generator 110, this is accomplished in the following manner. Input pulses on line 112 to divide by 40 multivibrator 116, which it will be recalled is reset at the beginning of each second by output pulses from divide by 16,000 circuit 113, produces a 400 Hertz square wave output on output line 125. This signal is supplied as one input to AND gate 122, during the first second of operation of a three second cycle of operation of the apparatus. The AND gate 122 is conditioned to pass to 400 Hertz square wave pulses supplied on input line 125 during this initial second of the three second operational cycle. The 400 Hertz square wave pulses passed by the AND gate 122 are thus supplied during this initial second of operation to a 400 Hertz band pass filter 126 which shapes the square wave pulses into a sine wave shape by the action of the tuned circuitry contained therein. Thus the output of the 400 Hertz band pass filter 126 comprises a 400 Hertz sine wave which is supplied as input to an amplifier 127 and amplified to a more usable signal level. This signal is supplied as input to a driver amplifier 128 which is coupled to the neutron generator tube ion source and thus applied as a sine wave intensity modulation to the neutron flux output of the generator tube.

The AND gates 123 and 124 are similarly conditioned during the second and third seconds of a three second operational cycle of the apparatus. The two kilohertz square wave output of divide by 8 circuit 115 is supplied on input line 129 to AND gate 123. The four kilohertz square wave output pulses from divide by 4 circuit 114 are supplied on input line 130 to AND gate 124. Outputs from AND gates 123 and 124 are similarly shaped by 2000 Hertz band pass filter 131 and 4000 Hertz band pass filter 132 to provide sine wave output wave shapes to amplifiers 133 and 134 respectively during the second and third seconds of the operational cycle of the circuit. In this manner, an intensity modulated neutron output at 400 Hertz for the first second of operation, 2000 Hertz for the second second of operation and 4000 Hertz for the third second of operation are provided. This cycle is depcited graphically in FIG. 8 of the drawings.

Now concerning the synchronization of the transmission of the detected gamma rays during the different intervals of neutron modulation for transmission to the surface, it will be observed that the output conditioning signals from divide by 3 one shot 158 are supplied on lines 119, 120 and 121 to AND gates 107, 108, 109, 135, 136 and 137. It will be recalled that data pulses from the sodium iodide/photomultiplier detector are continuously coupled to one input of AND gates 107, 108 and 109. Similarly, 16 kilohertz clock pulses are supplied via pulse shaper circuit 138 (which may be of conventional design) to the opposite inputs of AND gates 135, 136, and 137. During the first second of operation of a three second operating cycle the AND gate 109 and the AND gate 137 are conditioned for operation while the remaining AND gates 107, 108, 135 and 136 are in a blocked condition. Thus, during the first second of operation data pulses from the detector are passed by AND gate 109 and the AND gate 137 passes the 16 kilohertz clock pulses. These pulses are supplied with the clock pulses being of one polarity and the data pulses being of the opposite polarity due to the action of inverters 140, 141 and 142 in reversing the polarity of the clock pulses. The data pulses and the clock pulses are summed at mixing point 143 during the first second of operation. The mixed clock and data pulses of opposite polarity are then linearly amplified by a predetermined scale factor by amplifier 144 during this first second of operation of a three second cycle of the neutron source which is being modulated at a 400 Hertz frequency, the data pulses detected during this portion of the cycle and the clock pulses from the 16 kilohertz clock oscillator 111 are applied to a pulse transmission circuit 145 for transmission to the surface. Similarly, during the second second of operation data pulses from the detector system are supplied together with the 16 kilohertz clock pulses via a second scale factor amplifier 146 to the pulse transmission circuit 145 for transmission to the surface. Finally, during the third second of the three second operating cycle, mixed data pulses and clock pulses are supplied to the pulse transmission circuit 145 via a third scale factor amplifier 147. The amplification levels of the scale factor amplifiers 144, 146, and 147 are set substantially apart so that at the surface, the signals representing the clock pulses and the data pulses occurring during the three different time gating intervals may be discriminated against each other by the use of a pulse height discriminator as will be described. That is to say, the scale factor amplifier 144 may have a gain factor of 10 while the scale factor amplifier 146 may have a gain factor of 20 and the scale factor amplifier 147 may have a gain factor of 30. Thus, during the three different seconds of the operational cycle, signal levels transmitted to the pulse transmission circuit 145 have substantially different voltage levels prior to their introduction to the cable for transmission to the surface. This transmission scheme is depicted graphically in FIG. 7.

Figures 7, 8, 9:
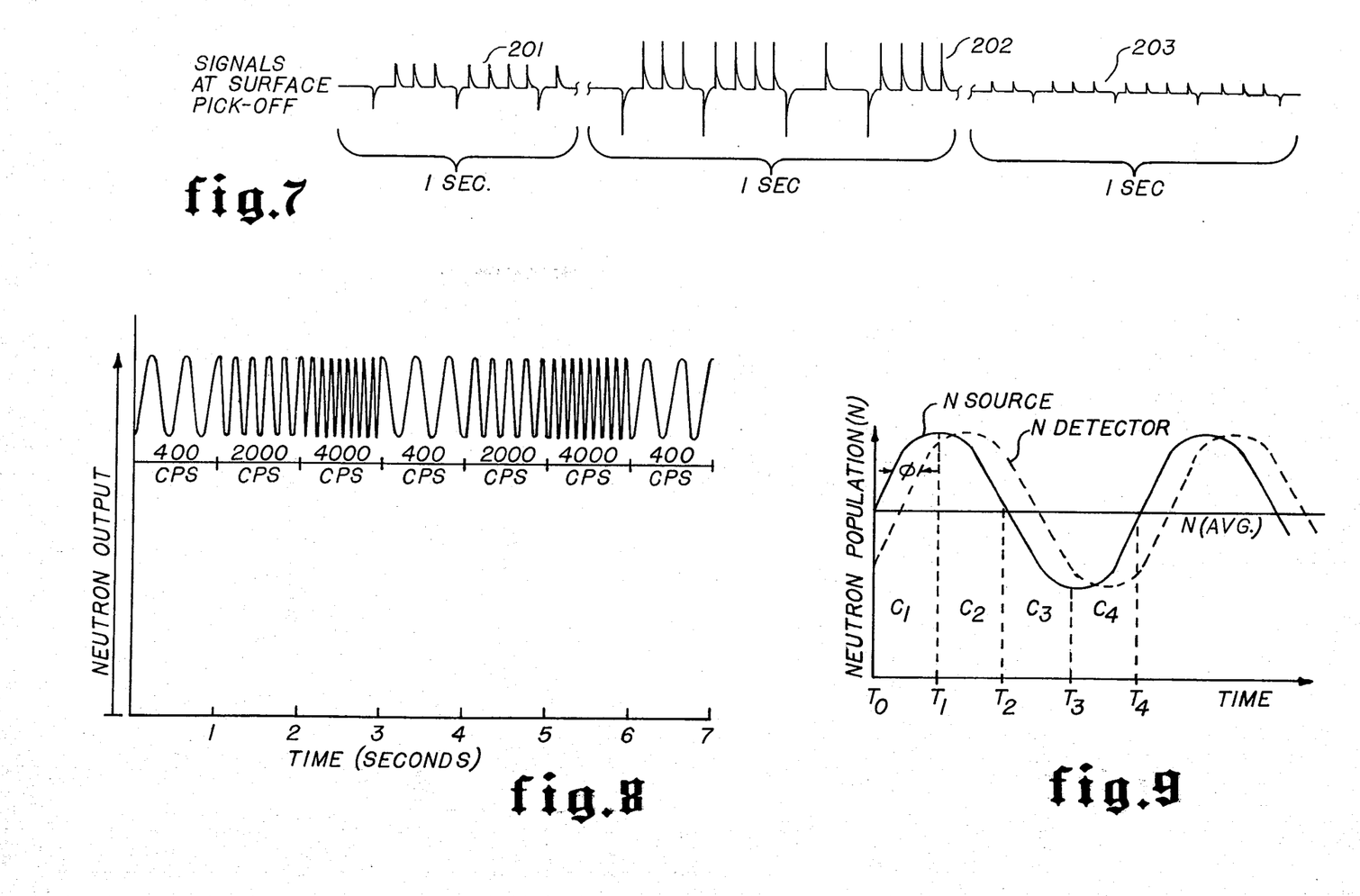
FIG. 7 is a schematic illustration of the waveform of signals sent to the surface from the downhole tool in the invention.
FIG. 8 is a schematic illustration showing the measurement cycle or sequence of neutron outputs at three different frequencies of intensity modulation of the neutron source.
FIG. 9 is a graphical illustration showing the counting periods used to determine the relative phase shifts.

Output signals from the pulse transmission circuit 145 are capacitively coupled via a capacitor 153 to the center conductor 152 of the well logging cable. High voltage D.C. for the operation of the photo-multiplier tube 102 is also provided on the center conductor of this cable from surface power supplies. The B+ voltage for operation of the preamplifier 103 is supplied from a surface power supply on the shield 151 of this cable. Thus a signal wave form as illustrated in FIG. 7 is applied to the cable during the operation of the downhole equipment. In the illustration of FIG. 7 the first second of operation (illustrated at 201) is characterized by the transmission of negative sharp spike synchronization and data pulses occurring at a random interval following each of the 16 kilohertz synchronization pulses. Similarly, during the second second of operation (202 of FIG. 7) the negative sharp spike synchronization pulses occur, but with a larger voltage amplitude than during the first second of operation. The randomly occurring spike data pulses again have a positive voltage and follow each sync pulse. Finally, during the third second of operation (as illustrated at 203 in FIG. 7) the negative 16 kilohertz clock pulses occur at regularly spaced intervals. Each sync pulse is followed by plurality of randomly occurring positive voltage level pulses corresponding to gamma ray counts made during the intervals between the 16 kilohertz data pulses.

This information is transmitted to the surface where it is interpreted in terms of the tangents of the phase angles occurring at each of the three different modulation frequencies by the data processing circuitry shown in FIG. 3. Prior to the consideration of the operation of the circuitry of FIG. 3, however, it will be appropriate to consider how the tangent of the phase angle is determined. Referring to the drawing of FIG. 9 a single cycle of the intensity modulated neutron cloud at the neutron source (solid curve) and at the neutron detector (dashed curve) is illustrated schematically. The straight line (labelled N(avg)) represents the average neutron population generated. It will be observed that a phase shift $\phi$ between the neutron population at the source and at the detector due to the neutron lifetime (or thermal neutron decay time) of the borehole and formation materials, exists as previously discussed. If the neutron source modulation cycle begins at $t_0$ as shown, and is divided into four quadrants as a function of time, these quadrants will end at $t_1$, $t_2$, $t_3$, and $t_4$ and will each be of a duration $t_1 - t_0$ which is dependent on the modulation frequency $\omega$. If the counts of capture gamma rays occurring at the detector during each of the four quadrants of the modulation cycle are labelled $C_1$, $C_2$, $C_3$, and $C_4$, then it may be shown that the tangent of the phase angle $\phi$ is given by:

$$-\text{Tan } \phi = \frac{(C_1+C_4) - (C_2+C_3)}{(C_1+C_2) - (C_3+C_4)} \tag{12}$$

Thus, it is possible by determining the counts of gamma rays occurring in each of the four quadrants of a cycle of modulation of the fast neutron source, to derive the relative phase angle $\phi$ of the phase coherent neutron cloud at the detector with respect to the modulated cloud of thermalized neutrons produced by the fast neutron source. The only approximation used in making this derivation of the tangent of the phase angle is that the slowing down time of the fast neutrons is short with respect to the thermal neutron decay time (or neutron lifetime) of the earth formations in the vicinity of the well borehole. This is usually an excellent approximation.

Referring now to FIG. 3, the surface data processing signal equipment is illustrated in block diagram form. The well logging cable 150 center conductor 304 is provided with high voltage for the operation of the photomultiplier tube (102 of FIG. 2) by high voltage power supply 305 which is resistively coupled thereto by resistor 303. The B+ voltage for the operation of associated downhole circuits is coupled from B+ power supply 383 to the inner coaxial shield of the logging cable 150 in a similar manner. The alternating current data signals produced by the downhole equipment are extracted via a coupling capacitor 302 and supplied as input to a pulse separator 306. It will be recalled that the 16 kilohertz synchronization pulses are provided as sharp peaked positive going voltages on this cable while the data pulses are provided as randomly occurring negative sharp peaked pulses. The pulse separator 306 functions to provide output pulses on two lines with the 16 kilohertz synchronization pulses occurring on output line 307 and the randomly occurring data pulses on output line 308.

It will also be recalled that the three different frequency portions of modulation of the downhole neutron generator were characterized by the three different levels of voltage amplifications which are applied to both the synchronization pulses and clock pulses at the downhole tool. This results in three different voltage amplitude components which correspond to the three different frequency modes of operation being supplied to the surface equipment. Thus, the output synchronization pulses on line 307 occur at three different characteristic voltage levels when output from the separator 306. These synchronization pulses are input to three voltage level discriminators 309, 310, and 311. Voltage level discriminators 309, 310 and 311 separate the clock pulses which occur during each period of one second duration of the different frequency modulations applied to the downhole neutron source on the basis of their amplitudes. Voltage level discriminator 309 thus permits only clock pulses occurring during the 400 Hertz modulation to be output therefrom on line 312. Similarly, 2000 Hertz voltage discriminator 310 only permits synchronization or clock pulses to be output therefrom on line 313, while 4000 Hertz voltage discriminator 311 only permits clock pulses to be output therefrom on line 314 during the 4000 Hertz modulation.

Voltage level discriminators 309, 310, and 311 thus provide clock or sync pulse output on their respective output lines 312, 313, and 314 only while their respective modulation frequency periods are occurring in the downhole tool. Considering now the operation of the portion of the circuitry which concerns the 400 Hertz intensity modulation of the downhole neutron source, the occurrence of the clock or sync pulses on line 312 (which is permitted to enter at the beginning of the 400 Hertz modulation) is used to set (after a 2.5 millisecond delay provided by a delay divide by 40 circuit 380) a flip-flop 315 and to immediately reset a second flip-flop 316 in the 4000 Hertz modulation portion of the circuit. Similarly, the occurrence of the clock pulses on output line 313 is used to set (after a 2.5 millisecond delay provided by delay divide by 40 circuit 381) a flip-flop 317 and to immediately reset the flip-flop 315. This action causes the three channels of the circuit (corresponding to the three different frequencies of modulation) to be alternately and singly activated for counting purposes as the voltage level on the output lines of flip-flop 315, 316 and 317 are used to condition a plurality of AND gates and will be described subsequently. The 2.5 millisecond delays provided by delay circuits 380, 381 and 382 are included to allow any phase shift effects of thermal neutrons from the just completed different modulation frequency portion of the operating cycle to die away before beginning to make the phase shift determination at the new operating frequency. A few counts will be lost in this manner (only about 0.25%) but increased accuracy will result. The 2.5 millisecond delay is one full period of 400 Hertz modulation, five periods of 2000 Hertz modulation and 10 periods of 4000 Hertz modulation. These times far exceed the amount of phase shift to be measured and will allow effects from the previous modulation cycle to dissipate prior to the beginning of measurement.

Returning now to the consideration of the 400 Hertz modulation processing circuitry, the clock pulses occurring on line 312 are supplied as input to a counter-shift register 318 during a 400 Hertz modulation of the downhole neutron source. One complete cycle of modulation of the source occurs each one four-hundredth of a second (2500 microseconds). The clock pulses at 16 kilohertz appear once each 62.5 microseconds. Thus, upon the occurrence of each ten clock pulses supplied to the counter shift register 318, one quadrant of one cycle of modulation of the downhole neutron source occurs. Countershift register 318 provides an output voltage level on line 319 during the first quadrant of one cycle of modulation; it provides an output voltage level on line 320 during the second quadrant of such cycle of modulation; it provides an output on line 321 during the third quadrant of the cycle of modulation; and it provides an output voltage level on line 322 during the fourth quadrant of the cycle of modulation. These output voltage levels provided successively on lines 319, 320, 321 and 322 are also used in conditioning the plurality of AND gates associated with this circuitry. It should be mentioned here that the counter-shift register 318 is also reset by the appearance of the first clock pulse appearing on output line 313 from the 2000 Hertz voltage level discriminator 310, so that upon completion of one second of the 400 Hertz modulation, the first clock pulse appearing on output line 313 clears the counter-shift register 318 circuit and enables it to start counting anew upon the initialization of the next 400 Hertz modulation portion of the operational cycle of the downhole equipment.

The AND gates 323, 324, 325 and 326 are associated with the 400 Hertz channel of the circuit of FIG. 3. These multiple input AND gates require the presence of a voltage level on each of their three input leads before they will produce a pulse. One input lead of each of AND gates 323, 324, 325 and 326 is connected to the gamma ray count data input line 308 from the pulse separator circuit 306. A second input lead of each of these AND gates is connected to the conditioning flip-flop 315 described previously, and the third input lead of each of these multiple input AND gates is connected to one of the output lines of counter-shift register 318, which corresponds to one of the quadrants of a cycle of modulation of the downhole neutron source. Thus, during the first quadrant of operation of a 400 Hertz modulation cycle in the downhole tool (following the 2.5 millisecond delay), data pulses are permitted only through AND gate 323. Similarly, during the second quadrant of a 400 Hertz modulation cycle the data pulses are only permitted through AND gate 324 and, similarly, AND gates 325 and 326 permit the passage of data pulses occurring only during the third quadrant and fourth quadrant respectively of a cycle of 400 Hertz modulation. Four OR gates 327, 328, 329, and 330 together with a pair of up/down counters 331 and 332 are used to form the expressions of the numerator and denominator of the fraction of Equation (12) in the following manner.

$C_1$ counts occurring during the first quadrant of the modulation cycle from AND gate 323 are supplied as inputs to OR gates 327 and 329. Similarly $C_2$, second quadrant, outputs from AND gate 324 are supplied as inputs to OR gates 328 and 329. $C_3$ counts occurring during the third quadrant of the 400 Hertz modulation cycles are supplied as inputs to OR gates 328 and 330. Finally, during the fourth quadrant of modulation, $C_4$ counts are supplied to OR gates 330 and 327. The numerator of the fraction of Equation (12) is formed in up/down counter 331 while the denominator of this expression is formed in up/down counter 332. Observing the numerator of the fraction of the expression of Equation (12) it will be noticed that the expression may be formed by counting up during quadrants 1 and 4 in counter 331 and counting down (subtracting) during quadrants 2 and 3 in the same counter. Thus, the $C_2$ and $C_3$ counts are supplied to the down count input terminal of up/down counter 331 while the $C_1$ and $C_4$ counts are supplied to the up/count input terminal in this counter. Thus, at the end of each complete cycle of 400 Hertz modulation of the neutron source the up/down counter 331 contains a digital number representative of the numerator of the fraction of the expression of Equation (12).

Similarly, the expression of the denominator of the fraction of Equation (12) is formed during each cycle of modulation in the up/down counter 332. Thus during the one-second 400 Hertz modulation period of a given operational sequence in the downhole tool, up/down counters 331 and 332 contain the expressions representing the numerator and denominator of the fraction of Equation (12).

Now concerning the extraction of these digital numbers contained in counter 331 and 332, the plurality of one shot and delay one shot multivibrators 333 – 341 is used for this purpose. Upon the occurrence of an output voltage level from the flip-flop 315, a voltage is applied on line 342 to a delay one shot 336 and to a transfer one shot 333. The occurrence of a voltage pulse on one shot 333 causes and X' transfer voltage to be output from the one shot which is supplied to quad latch circuits 343 and 344. This causes the quad latch circuits 343 and 344 to extract the digital number contained in the up/down counters 331 and 332 at that time. The presentation of this voltage level on line 342 to the delay one shot 336 causes the occurrence (at a time one second later) of an output voltage from the delay one shot 336 which is input to a one shot multivibrator 339. Multivibrator 339, in turn, provides an output X voltage for resetting the up/down counters 331, 332.

The result of the X transfer one shot voltage levels and the X' reset voltage levels is to cause the output of up/down counters 331 and 332 to be extracted at the end of each one second period of 400 Hertz modulation of the neutron source and the up/down counters forming the numerator and denominator of the fraction of Equation (12) to be reset following each one second period of operation at the 400 Hertz frequency of modulation in the downhole tool. In a similar manner, one shots 334 and 337 are responsive to input voltages on lines 350 and 351 corresponding to the occurrence of output clock pulses from flip-flops 317 and 316, respectively and cause the extraction into quad latch circuits 352, 353, 354 and 355 of the numerator and denominator signals accumulated in a similar manner in the up/down counters 356, 357, 358 and 359 of the circuits corresponding to the 2000 Hertz and 4000 Hertz modulation portions of the operative cycle of the downhole tool.

Returning to consideration of the 400 Hertz modulation channel, the digital numbers occurring at the end of the one second periods of modulation in the quad latches 343 and 344 are then applied to digital to analog converter circuits 360 and 361 which convert these into analog voltage levels are applied to an analog ratio circuit 362 which provides an output signal equal to the expression $-\text{Tan}\phi_{400}$ (or tangent phase angle at 400 Hertz). In a similar manner, digital to analog converter circuits 363, 364, 365 and 366 provide output voltage levels corresponding to the numerator and denominator of the fractions of the expression of Equation (12) for the other two operating frequencies of 2000 Hertz and 4000 Hertz modulation. These signals are then supplied as inputs to analog ratio circuits 367 and 368 to provide output signals representative of the tangent of the phase angle occurring at each of these frequencies of modulation. Thus, analog ratio circuits 362, 367 and 368 provide analog output voltages representative of the tangent of the phase angle occurring at each of the operative modulation frequencies of the downhole neutron source. These quantities may be supplied to recording channels in the recorder 18 of FIG. 1 for recording as a function of the borehole depth. Alternatively they can be supplied to digital computing apparatus, as previously discussed, for computing directly the borehole and formation components of the thermal neutron lifetime in the manner previously described.

While only the 400 Hertz channel of the data processing circuit of FIG. 3 has been described in detail, it will be appreciated that the 2000 and 4000 Hertz channels function in an analogous manner. The only differences between these channels occurs in the timing of the four sequential outputs of counter shift registers 369 and 370 which occur at times appropriate to delineate quadrant counts at each of these modulation frequencies appropriately.

The foregoing descriptions may make other alternative embodiments in accordance with the concepts of the present invention apparent to those skilled in the art. It is therefore the aim of the appended claims to cover all such changes and modifications as fall within the true spirit and scope of the invention.

I claim:

1. A method for determining the thermal neutron decay time of materials in the vicinity of a well borehole comprising the steps of:

continuously irradiating the earth formations in the vicinity of a well borehole with a phase coherent harmonically intensity modulated cloud of fast neutrons at first, second and third different modulations frequencies;

detecting as a function of time the intensity modulated thermal neutron population resulting from said irradiation at said at least three different modulation frequencies;

determining from said detected thermal neutron populations measured as a function of time, the tangents of the relative phase shift angles between said fast neutron cloud and said thermal neutron population at each of said first, second and third modulation frequencies;

combining said first and second phase angle tangents to derive a first approximation to the thermal neutron decay time of earth formations in the vicinity of a well borehole;

combining said first and third phase angle tangents to derive a second approximation to the thermal neutron decay time of earth formations in the vicinity of a well borehole; and combining said first and second approximations of the thermal neutron decay time according to a predetermined relationship to derive a value for the true thermal neutron decay time of the earth formations in the vicinity of a well borehole.

2. The method of claim 1 and further including the step of computing according to a predetermined relationship as a function of said true thermal neutron decay time of the earth formation in the vicinity of a well borehole, the thermal neutron decay time of the borehole fluid in a well borehole.

3. The method of claim 2 and further including the steps of repeating the steps of irradiating, detecting, determining the true thermal neutron decay times of the earth formations and borehole fluid at different depths in a well borehole and recording as a function of borehole depth the true thermal neutron decay time of the earth formations in the vicinity of a well borehole and the thermal neutron decay time of the borehole fluid in a well borehole.

4. The method of claim 1 wherein the step of combining said first and second phase angle tangents to derive a first approximation ot the thermal neutron decay time of earth formations in the vicinity of a well borehole is performed by graphically comparing said phase angle tangents according to a first precomputed graphical relationship between said phase angle tangents and assuming a value for the thermal neutron decay time of the borehole fluid in a well borehole.

5. The method of claim 4 wherein the step of combining said first and third phase angle tangents to derive a second approximation to the thermal neutron decay time of earth formations in the vicinity of a well borehole is performed by graphically comparing said phase angle tangents to a second precomputed graphical relationship between said phase angle tangents and assuming a value for the thermal neutron decay time of the borehole fluid in a well borehole.

6. The method of claim 5 wherein the assumed value of the thermal neutron decay time of the borehole fluid used to develop said first and second precomputed graphical relationships is the same for each such graphical relationship.

7. The method of claim 5 wherein the step of combining said first and second approximations to the thermal neutron decay time of the earth formations in the vicinity of a well borehole to derive a value for the true thermal neutron decay time of such earth formations is performed by comparing said first and second approximations to a precomputed graphical relationship between said approximate values and assuming a value for the thermal neutron decay time of the borehole fluid in a well borehole.

8. The method of claim 7 wherein the assumed value for the thermal neutron decay time of a borehole fluid is assumed to be less than that for the thermal neutron decay time of the earth formation in the vicinity of a well borehole.

* * * * *